United States Patent
Riviere-Cazaux

(10) Patent No.: US 9,842,185 B2
(45) Date of Patent: Dec. 12, 2017

(54) SYSTEMS AND METHODS FOR GROUP CONSTRAINTS IN AN INTEGRATED CIRCUIT LAYOUT

(71) Applicant: QUALCOMM Incorporated, San Diego, CA (US)

(72) Inventor: Lionel Riviere-Cazaux, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 14/832,669

(22) Filed: Aug. 21, 2015

(65) Prior Publication Data

US 2017/0053057 A1    Feb. 23, 2017

(51) Int. Cl.
*G06F 17/50* (2006.01)
*G03F 7/20* (2006.01)

(52) U.S. Cl.
CPC ...... *G06F 17/5081* (2013.01); *G03F 7/70433* (2013.01); *G03F 7/70466* (2013.01); *G06F 2217/06* (2013.01)

(58) Field of Classification Search
CPC ............. G06F 17/5081; G06F 2217/06; G03F 7/70433; G03F 7/70466
See application file for complete search history.

(56) References Cited

U.S. PATENT DOCUMENTS

| | | | | |
|---|---|---|---|---|
| 5,538,815 A | * | 7/1996 | Oi | G03F 1/28 430/30 |
| 7,865,857 B1 | * | 1/2011 | Chopra | G06F 17/5045 716/119 |
| 8,327,301 B2 | * | 12/2012 | Cheng | G03F 7/70433 716/110 |
| 8,495,548 B2 | | 7/2013 | Agarwal et al. | |
| 8,626,460 B2 | * | 1/2014 | Kaufman | G01R 31/2894 324/762.03 |
| 8,745,556 B2 | | 6/2014 | Chen et al. | |
| 8,949,747 B1 | * | 2/2015 | Wang | G03F 1/70 716/54 |
| 9,026,971 B1 | | 5/2015 | Ho et al. | |
| 9,176,373 B2 | * | 11/2015 | Cheng | G03F 1/00 |

(Continued)

OTHER PUBLICATIONS

International Search Report and Written Opinion—PCT/US2016/040700—ISA/EPO—dated Oct. 28, 2016.

*Primary Examiner* — Naum B Levin
(74) *Attorney, Agent, or Firm* — Arent Fox LLP

(57) ABSTRACT

Methods and apparatuses for configuring group constraints of features of cells for a multi-patterning process are provided. The apparatus determines features within a circuit layout, distance constraints for at least one of the features, group constraints for the features based on the distance constraints, the group constraints defining limits on groups assignable to each of the features. In addition, the apparatus receives an integrated circuit layout including a plurality of abutting cells. The apparatus then determines whether group constraints of a second cell conflict with group constraints of a first cell, the second cell abutting with the first cell, and configures a subset of the group constraints of the second cell based on the group constraints of the first cell and based on the group constraints of the second cell that conflict with the group constraints of the first cell.

18 Claims, 12 Drawing Sheets

(56) References Cited

U.S. PATENT DOCUMENTS

| | | | |
|---|---|---|---|
| 9,223,924 B2 * | 12/2015 | Hsu | G06F 17/5081 |
| 2011/0197168 A1 * | 8/2011 | Chen | G06F 17/5081 |
| | | | 716/50 |
| 2012/0219917 A1 * | 8/2012 | McGuinness | G03F 7/70466 |
| | | | 430/312 |
| 2015/0095857 A1 * | 4/2015 | Hsu | G06F 17/5081 |
| | | | 716/52 |
| 2015/0095865 A1 | 4/2015 | Bhattacharya et al. | |
| 2015/0100935 A1 | 4/2015 | Lin et al. | |
| 2015/0121317 A1 | 4/2015 | Lee et al. | |

* cited by examiner

SYSTEMS AND METHODS FOR GROUP CONSTRAINTS IN AN INTEGRATED CIRCUIT LAYOUT

BACKGROUND

Field

The present disclosure relates generally to multi-pattern technology, and more particularly, to a multi-patterning compliance technique for determining and configuring group constraints of features within an integrated circuit (IC) layout.

Background

Continued demand for better performance and reduced power consumption of integrated circuits (ICs) has led to vast technological improvements in the semiconductor industry. The reduction of the size of components within the ICs, which allows for greater transistor density, faster speeds, and lower power consumption, is one such improvement.

Lithographic resolution, which governs the ability to project an accurate image of very small objects onto an IC substrate, is limited in part by the wavelength of light used during photolithography. This limit in lithographic resolution may be referred to as a "printable threshold." Multi-patterning lithography (MPL) is one lithography technique that may be used to increase IC pattern density and overcome the limitations in lithographic resolution. MPL allows an IC layout to be decomposed into two or more colors (e.g., red, blue, yellow, etc.), such that features of one color are formed on one mask and features of another color are formed on another mask. By dividing features of an IC layout into multiple masks, it is possible to fabricate semiconductor devices with object sizes and spacing that are beyond the limits of lithographic resolution.

MPL, however, has many drawbacks, including very long color decomposition run times, decomposition problems that cannot be resolved or that never converge, color balance issues at chip level, and color conflict. Thus, the need arises for a solution that improves the color decomposition speed of MPL while avoiding color balance and conflict issues.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus for assigning group constraints to features in a layout for a multi-patterning process is provided. The apparatus may be a tool (e.g., a software tool) for performing boundary conflict checks between features within an integrated circuit layout. The apparatus is configured to determine features within the circuit layout, determine distance constraints for at least one of the features, and determine group constraints for the features based on the distance constraints. The group constraints define limits on groups assignable to each of the features. In addition, the apparatus is configured to assign the group constraints to the features.

In addition, the apparatus is configured to receive an integrated circuit (IC) layout including a plurality of abutting cells. In addition, the apparatus is configured to determine whether group constraints of a first cell of the plurality of abutting cells conflict with group constraints of a second cell of the plurality of abutting cells. The first cell abuts the second cell. Further, the apparatus configures a subset of the group constraints of the first cell based on the group constraints of the second cell and based on the group constraints of the first cell that conflict with the group constraints of the second cell.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
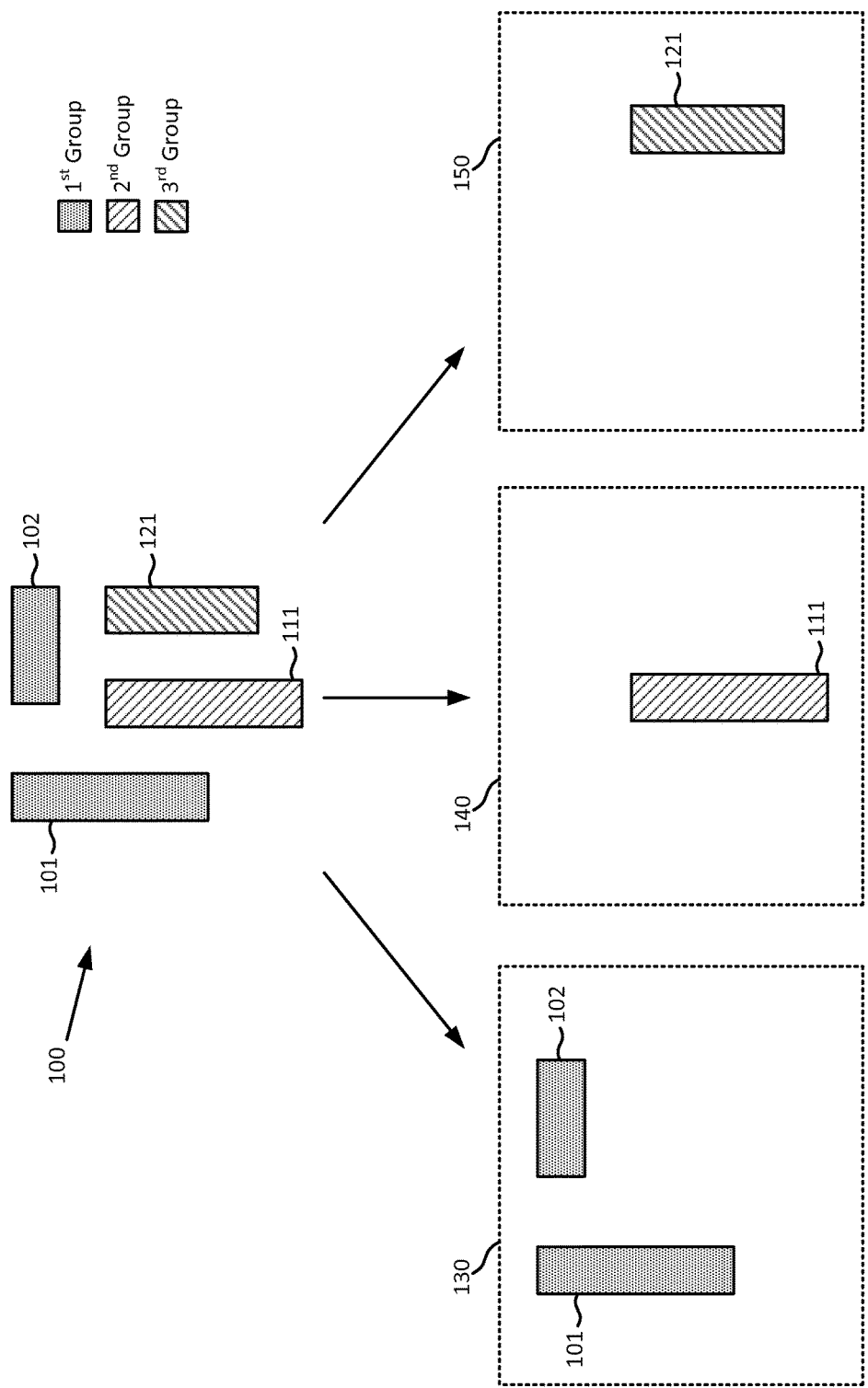
FIG. 1 is a diagram conceptually illustrating an exemplary decomposition of an IC layout for a multi-patterning lithography process.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Apparatuses and methods will be described in the following detailed description and may be illustrated in the accompanying drawings by various blocks, modules, components, circuits, steps, processes, algorithms, elements, etc. Moreover, the term "component" as used herein may be one of the parts that make up a system, may be hardware or software or some combination thereof, and may be divided into other components.

To fabricate an integrated circuit (IC), a designer may use an electronic design automation (EDA) tool to create a schematic design. This schematic design may include circuits that are coupled together to perform one or more functions. The schematic design may be translated into a representation of an actual physical arrangement of materials, which upon completion is called a design layout. Materials may be arranged in multiple layers for an IC, resulting in a design layout that includes several design layers.

After the design layers are complete, a fabrication process may be used to actually form the appropriate materials on each layer. This process may include a photolithographic process that directs a light source at a mask. In general, the mask may have opaque and transparent regions that when illuminated cause light to fall on photosensitive material in a desired pattern. For example, after light is shined through the mask onto a photosensitive material (e.g., positive resist), the light-sensitive material is subjected to a developing process to remove those portions exposed to light (or, alternatively, remove those portions not exposed to light when using a negative resist). Etching, deposition, diffusion, or some other material altering process may then be performed on the patterned layer until a particular material is formed with the desired pattern in that layer. The result of the process is a predetermined arrangement of material in each layer.

According to one aspect, a designer may use a library of standard cells to form the circuits, which in turn can be coupled to provide the desired functionality. Each standard cell may be a defined group of features constituting at least a portion of various structures, such as transistors and interconnects that provide a Boolean logic function (e.g., AND, OR, XOR, inversion, etc.) or a storage function (e.g., a flip-flop or a latch) or other types of functions (i.e., generally any function that may be implemented in an IC layout). Accordingly, the groups may be collections of one or more features. In one aspect, the features may represent at least one of a metal interconnect, a power rail, a POLY gate interconnect, a via, a metal POLY (MP) interconnect, or a metal diffusion (MD) interconnect. The features may also represent at least one of a metal cut, a poly cut, and a metal poly cut, each of which may be achieved by line and cut patterning. Line and cut patterning is a lithographic process that involves patterning feature lines (e.g., metal, poly, or poly metal) and then printing cut patterns in an orthogonal direction to the lines in order to create a short space (e.g., a "cut") separating at least one of the lines into two line parts. Each standard cell may also have a circuit design layout. The circuit design layout for a standard cell represents the standard cell as an actual physical arrangement of materials. Accordingly, the circuit design layout for a standard cell may be a portion of a design layout that implements that particular standard cell. The circuit design layout provides an effective manufacturing blueprint for a material layer. For example, the circuit design layout may include masks that are formed for the various layers of the design layout.

Multi-patterning lithography (MPL) may allow the use of multiple masks to expose the same IC substrate, thereby effectively multiplying the feature/object density in that layer. For example, FIG. 1 is a diagram conceptually illustrating an exemplary group (e.g., color) decomposition of an IC layout 100 for an MPL process. The IC layout 100 may include a plurality of features (also referred to as objects) 101, 102, 111, 121, each of which may be separated from a neighboring feature by a space that is less than the printable threshold (i.e., which cannot be formed on a single mask). The plurality of features 101, 102, 111, 121, may all be from the same layer (e.g., metal layer 1).

Color decomposition involves "grouping," "coloring," or "color assignment" of features where each group or color corresponds to a different mask. The group or color assignment should be done such that features in each mask of a particular group do not violate the minimum printable threshold spacing.

Because neighboring features are separated by a space that is less than the printable threshold, they may be decomposed to different masks. For example, features 101, 102, 111, 121 may be decomposed in a manner that forms a first mask 130, a second mask 140, and a third mask 150. Specifically, as illustrated in FIG. 1, features 101, 102 may be assigned to a first group (e.g., assigned a first arbitrary color, such as yellow) associated with the first mask 130, feature 111 may be assigned to a second group (e.g., assigned a second arbitrary color, such as blue) associated with the second mask 140, and feature 121 may be assigned to a third group (e.g., assigned a third arbitrary color, such as red) associated with the third mask 150. The arbitrary colors are one way of helping a designer keep track of which shapes of a particular layer are assigned to which one of the multiple masks associated with that layer.

The first, second, and third masks 130, 140, 150, when exposed separately and subsequently combined, may achieve the target pattern of the IC layout 100.

The MPL process may be extended to multiple patterning of N masks where N is an integer. The printable feature spacing may be reduced approximately by a factor of N because feature spacing belonging to different masks is no longer limited by the wavelength of light. Increasing the number of masks, however, exponentially increases the complexity of color decomposition. Color decomposition is taking a design layout for which features have not been assigned to individual MPL masks and assigning features of the design layout to the masks. Color decomposition may be performed by EDA software. Once the EDA software, for example, completes the color decomposition, the MPL masks may be made using the resulting decomposed design. Increasing the number of masks, and thereby increasing the complexity of color decomposition results in very long color decomposition run times and decomposition problems that cannot be resolved or that never converge, and introduces other issues, such as color balance and color conflict.

Accordingly, aspects of the present disclosure relate to a method and apparatus for transforming physical constraints between features into logical operations that facilitate in determining group constraints of features within an IC layout during the MPL process to reduce the complexity of color decomposition that results from decomposing multiple colors.

Figure 2:
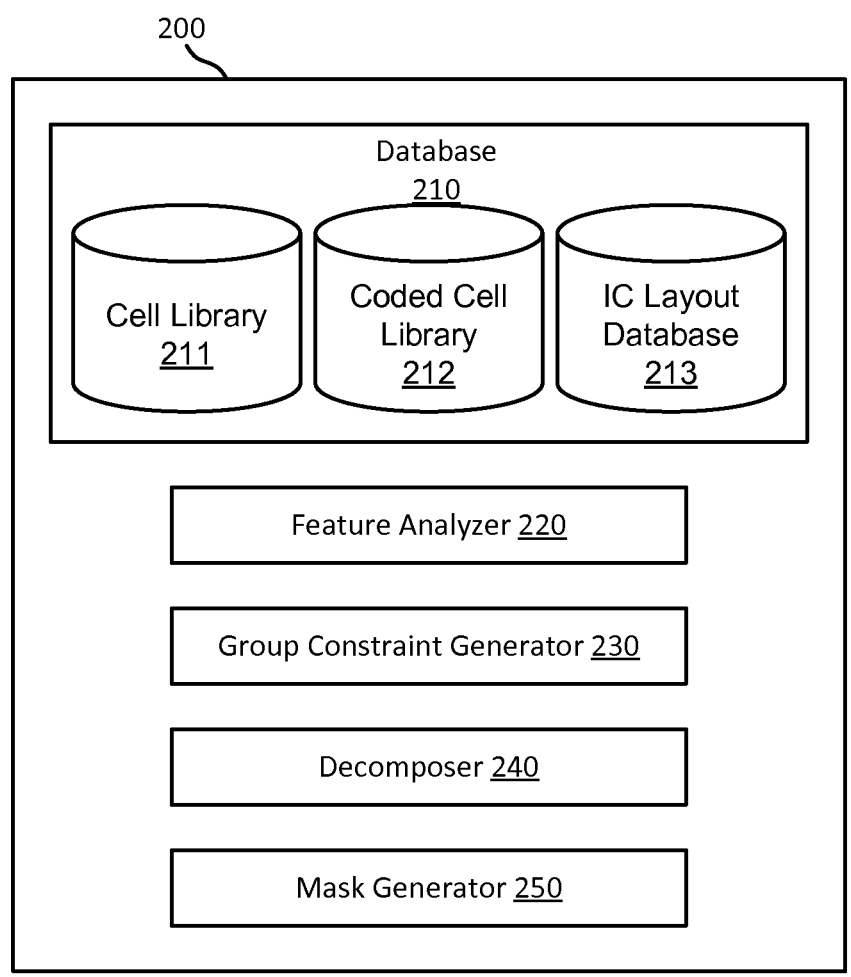
FIG. 2 is a diagram conceptually illustrating an example apparatus configured for determining group constraints of features during a multi-patterning lithography process.

FIG. 2 is a diagram conceptually illustrating an example apparatus 200 configured for determining group constraints of features within an IC layout during a multi-patterning lithography process. In an aspect, the apparatus 200 may include a database 210, which may include a cell library 211, a coded cell library 212, and an IC layout database 213. The apparatus 200 may also include a feature analyzer 220, a group constraint generator 230, a decomposer 240, and a mask generator 250.

The cell library 211 may include any type of cells and layouts that support abutment methodologies, such as standard cells, programmable cells, layout templates, layout fabrics, etc. Each of the cells in the cell library 211 may define a structure of features that provides a function, as previously discussed. The cells, such as standard cells, may be colorless in that none of the features of the cell are assigned a color. In other words, cells, such as standard cells may, in some examples, not be assigned to a group. The coded cell library 212, on the other hand, may include cells that are assigned to a color, for example. Accordingly, the coded cell library 212 may include a plurality of coded cells, each of which may include features that have been assigned to a group based on their respective group constraints by the group constraint generator 230. Furthermore, each of the coded cells may correspond to a respective cell in the cell library 211.

In an aspect, during operation, the feature analyzer 220 may retrieve a cell from the cell library 211 and determine what features are in the cell. Features may have distance constraints. The distance constraint for a feature may be a minimum distance allowed between the feature and another feature. Accordingly, the feature analyzer 220 may also determine distance constraints for each of the features by determining, e.g., by measuring, a spacing distance between each of the features within the cell, and further determine whether the spacing distance is less than a threshold spacing distance (e.g., 70 nm). As previously discussed, the threshold spacing distance is a distance that is less than the printable lithographic threshold.

Once the feature analyzer 220 determines the distance constraints between each of the features in the cell, the group constraint generator 230 may determine group constraints for the features based on the determined distance constraints. The group constraints may define limits on groups that are assignable to each of the features. The group constraint generator 230 may code the group constraints for each feature as a logical operation using, for example, Boolean algebra. The group constraints for each of the features may be determined based on previously determined group constraints to ensure that the coloring of the features (or assigning of features to different groups/masks) will not result in spacing violations between features of the same color or group. In one aspect, the group constraint generator 230 may determine a number of distance constraints for each of the features, and begin the assignment of group constraints with the feature that has the greatest number of distance constraints from among the features in the cell. The group constraint generator 230 may then determine the group constraints for other features within the cell based on the group constraint assigned to the first feature. In particular, the group constraint generator 230 may determine the group constraints by assigning a group constraint for an $n^{th}$ feature of the features based on previously assigned group constraints for $1^{st}$ through $(n-1)^{th}$ features of the features within the cell. Once the group constraint generator 230 determines the group constraints for all the features within the cell and codes the respective group constraints into the respective features, the group constraint generator 230 may store the now coded cell having the coded features in the coded cell library 212.

In one aspect, the group constraint generator 230 may retrieve an IC layout with a plurality of abutting coded cells (e.g., cells having features with previously assigned group constraints) from the coded cell library 212. As used herein, abutting cells (coded cells or un-coded cells) may include cells that are adjacent, touching, or joined at an edge or border. In another aspect, the group constraint generator 230 may retrieve an IC layout template with a plurality of abutting uncoded cells (e.g., cells having features with no assigned group constraints) from the cell library 211. In the case the template includes uncoded cells, the group constraint generator 230 may populate the layout template with coded cells from the coded cell library 212 such that each of the cells in the layout template is replaced with respective coded cells, each of which includes features with assigned group constraints.

The feature analyzer 220 together with the group constraint generator 230 may then determine whether there are any conflicts between group constraints of abutting cells, and thereafter the group constraint generator 230 may resolve the conflicts by configuring the group constraints of abutting cells. For example, the group constraint generator 230 may determine whether group constraints of a second cell conflict with group constraints of a first cell, where the second cell is abutting with the first cell. Specifically, the feature analyzer 220 may determine that a second cell feature of the second cell has a distance constraint with a first cell feature of the first cell. As for individual cells, the distance constraint between features of abutting cells is determined by determining a spacing distance between the features of the abutting cells. For example, the feature analyzer 220 may determine the spacing distance between the first cell feature and the second cell feature, and determine whether the spacing distance between each of the first cell feature and the second cell feature is less than a threshold spacing distance. If the feature analyzer 220 determines that a distance constraint exists between the first cell feature and the second cell feature, the group constraint generator 230 may then determine whether a group constraint conflict exists between the first cell feature and the second cell feature. In particular, the group constraint generator 230 may determine whether a group constraint of the second cell feature has at least one group in common with a group constraint of the first cell feature. A group constraint conflict exists between adjacent features if the group constraints of the respective features have at least one group in common.

If the group constraint generator 230 determines that a group constraint conflict exists between features of abutting cells, the group constraint generator 230 may configure one or more of the group constraints of one of the cells to resolve the conflict. For example, the group constraint generator 230 may configure a subset (e.g., one or more) of the group constraints of the second cell based on the group constraints of the first cell when the group constraints of the second cell conflict with the group constraints of the first cell. In particular, the group constraint generator 230 may configure the subset of the group constraints of the second cell based on the group constraints of the first cell by changing the group constraints of the second cell to resolve the conflict between the group constraints of the second cell and the group constraints of the first cell. For example, configuring the subset of the group constraints of the second cell may include: (1) swapping one group for another group within the group constraints of the second cell; (2) narrowing the group constraints of the second cell by eliminating at least one group from being assignable to a first feature within the second cell; and (3) narrowing the group constraints of the second cell by eliminating at least one group from being assignable to remaining features within the second cell that have a distance constraint with the first feature within the second cell. In this manner, the group constraint generator 230 may resolve any group constraint conflicts between abutting cells.

The group constraint generator 230, together with the feature analyzer 220, may perform the aforementioned procedure for each abutting cell within the IC layout such that the features of the cells are coded with group constraints that allow for a resolvable decomposition of the IC layout.

In an aspect, the group constraint generator 230 may also determine which of the features in the IC layout are multiple group features. A multiple group feature may, for example, be a feature with a coded group constraint that allows the feature to be assigned to two or more groups. The group constraint generator 230 may then determine the balance of feature distribution among the plurality of groups. For example, the group constraint generator 230 may determine the number of features assigned to each group, as well as the area occupied by the features assigned to each group. Based on these determinations, the group constraint generator 230 may, for example, assign each of the multiple group features to a group with the lowest feature count and/or a group with a smallest feature area such that the feature count and feature area of each respective group is balanced among the groups.

In an aspect, the group constraint generator 230 may perform this group/feature balancing procedure for each different set of multiple group features, where each set differs by the group constraints assigned to its multiple group features. For example, a first multiple group feature set may include features that are assigned a group constraint limiting the features to either Group A or Group B; and a second multiple group feature set may include features that are assigned a group constraint limiting the features to either Group B or Group C. Additionally, the group constraint generator 230 may determine that Group A of the IC layout includes the fewest features out of Groups A, B, C. To balance the feature count among Groups A, B, C, the group constraint generator 230 may reconfigure the group constraints of the first multiple group feature set such that all or a portion of the features are limited to Group A, thus increasing the number of features that are assigned to Group A and in turn balancing the feature count among Groups A, B, C. The group constraint generator 230 may then reanalyze the feature count/area among the groups and perform the balancing procedure using all or a portion of the same or other sets of multiple group features.

Once the group constraint generator 230 determines, configures, and balances the group constraints of all features in the coded cells of the IC layout, the group constraint generator 230 may store the now coded IC layout in one or more of an IC layout database 213 or the coded cell library 212, or alternatively, transmit the coded IC layout to decomposer 240 for color decomposition.

The decomposer 240 may retrieve the IC layout from the coded cell library 212 or receive the IC layout from the group constraint generator 230, and execute a decomposition algorithm on the IC layout. The decomposition algorithm may assign different colors to the uncolored features of the IC layout based on the group constraints assigned to each of the features by the group constraint generator 230, until all features in the IC layout are assigned a color. In particular, the decomposer 240 may associate a different color with each of the different groups, such that the features of the same group are assigned the same color while the features of a different group are assigned a different color. The different colored features may be associated with different masks used in the MPL process, as exemplified in FIG. 1.

In this manner, by determining the group constraints and ensuring a viable and resolvable color solution for the IC layout, the apparatus 200 may significantly reduce the processing load on the decomposer 240, thereby preventing non-convergence of color decomposition, shortening color decomposition run times, as well as avoiding other issues such as color balance and color conflict.

In an aspect, the apparatus 200 may also include a mask generator 250. The mask generator 250 may generate multiple masks, based on the colored IC layout received from the decomposer 240, in a manner that writes features having the same color to the same mask. Once a design file that may be used to generate the actual physical masks is generated by the mask generator 250, the design file may then be used to generate the masks. The physical masks may be used in a semiconductor fabrication process.

Figure 3:
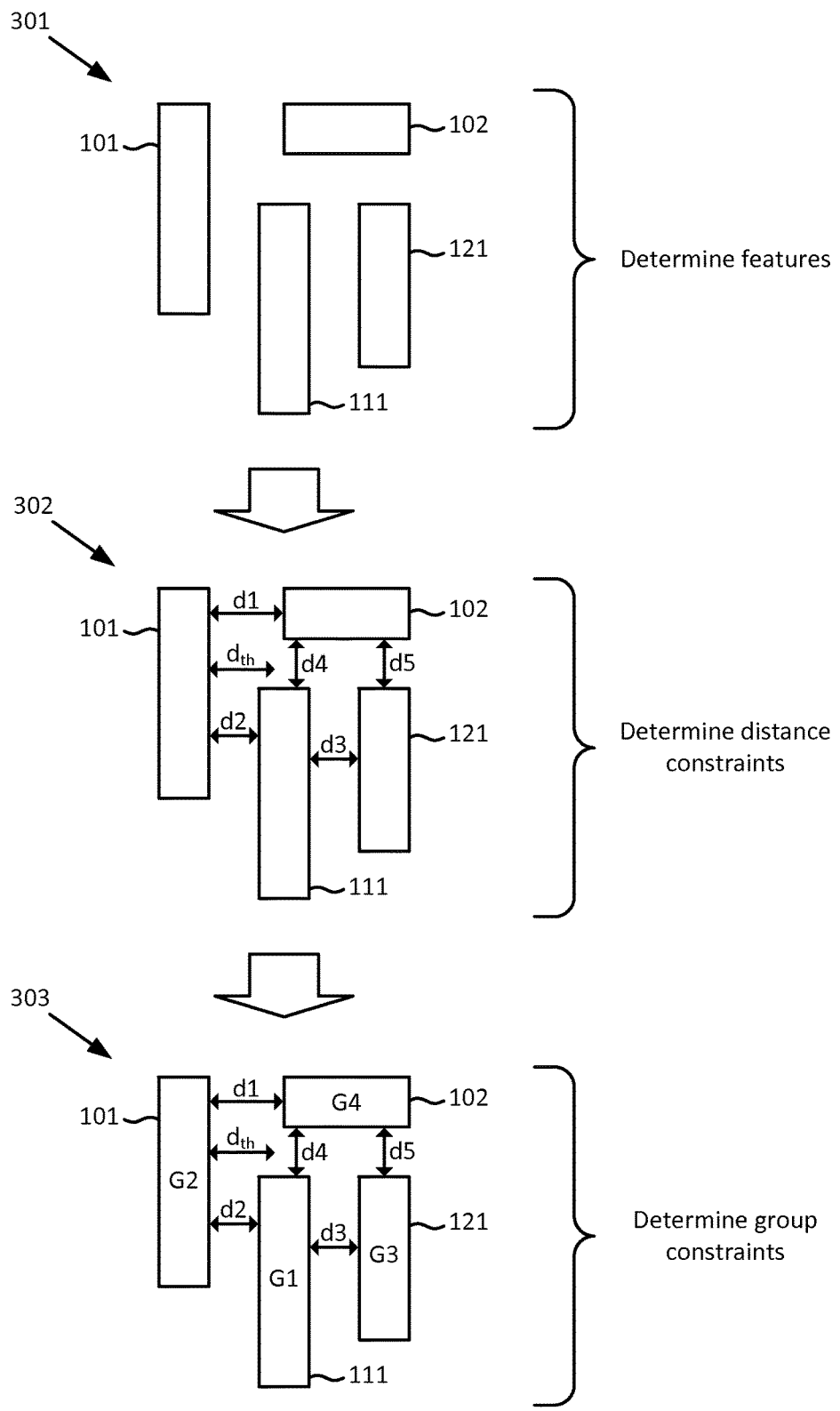
FIG. 3 is a flow diagram conceptually illustrating an example of a method of determining group constraints of features during a multi-patterning lithography process.

FIG. 3 is a flow diagram 300 conceptually illustrating an example of a method of determining group constraints of features within an IC layout during a multi-patterning lithography process. As illustrated in FIG. 3, the process may begin with a colorless cell 301 that may be retrieved from the cell library 211 by the feature analyzer 220. The feature analyzer 220 may determine that the cell 301 includes a number of features, such as, for example, features 101, 102, 111, 121.

The feature analyzer 220 may then determine distance constraints for each of the features by determining, e.g., by measuring, a spacing distance between each of the features 101, 102, 111, 121 within the cell 301, and determine whether the spacing distance is less than a threshold spacing distance $d_{th}$. For example, as illustrated in cell 302, the feature analyzer 220 may determine that a distance d1 between features 101 and 102 is greater than the threshold spacing distance. Accordingly, the feature analyzer 220 may not designate distance d1 as a distance constraint and may permit the features 101 and 102 to be in the same group without conflict. In an aspect, the feature analyzer 220 may also determine that the distance between feature 101 and feature 121 is likewise greater than the threshold spacing distance. The feature analyzer 220 may further determine that the following distances are less than the threshold spacing distance, thus designating these distances as distance constraints: distance d2 between features 101 and 111; distance d3 between features 111 and 121; distance d4 between features 102 and 111; and distance d5 between features 102 and 121.

Based on the distance constraints d2-d5, the group constraint generator 230 may determine group constraints for the features 101, 102, 111, 121. The group constraints may define limits on groups that are assignable to each of the features. The group constraint generator 230 may initially determine a number of distance constraints (e.g., distances that are designated by the feature analyzer 220 as distance constraints) for each of the features, and begin the assignment of group constraints with the feature that has the greatest number of distance constraints. For example, the group constraint generator 230 may determine that feature 101 has only one distance constraint d2; feature 102 has two distance constraints d4, d5; feature 121 has two distance constraints d3, d5; and feature 111 has three distance constraints d2, d3, d4. The group constraint generator 230 may determine that feature 111 has the greatest number of distance constraints (with three distance constraints). In an aspect, if two or more features qualify as features having the greatest number of distance constraints, but having the same number of distance constraints, the group constraint generator 230 may arbitrarily choose one of the features with which to begin the assignment of group constraints, and then move on to the next feature with the greatest number of distance constraints to assign group constraints. The same arbitrary group constraint assignment procedure may apply when the group constraint generator 230 encounters two or more features with the same number of distance constraints, regardless of whether or not the features have the greatest number of distance constraints. In this manner, the group constraint generator 230 may determine an order in which the respective features in the cell are assigned group constraints. In an aspect, the group constraint generator 230 may assign group constraints to every feature after the feature with the most distance constraints in an arbitrary order that is not based on the number of distance constraints on each feature.

The group constraint generator 230 may then begin assigning group constraints (which may also be referred to as color constraints) to the features. The group (color) constraints (G1, G2, G3, G4) are constraints that are applied to the features in order to determine groups (colors) that may be applied to the features. The group constraints may be a function of one or more groups (colors) and/or other group constraints. In one example, as illustrated in cell 303, the group constraint generator 230 may begin with feature 111 and assign group constraint G1 to feature 111. Group constraint G1 may be defined as a logical operation using, for example, Boolean algebra. In the example of FIG. 3, group constraint G1 may be a simple assignment to one of the plurality of groups (e.g., Groups A, B, C, which may also be denoted as GrpA, GrpB, GrpC in Boolean algebra form) in the MPL process, such as Group A out of Groups A, B, C. Accordingly, the logical operation of G1 may be G1=GrpA. As discussed above, the arbitrary colors/groups (e.g., one or more of GrpA, GrpB, and GrpC) are one way of helping a designer keep track of which features of a particular layer are assigned to which one of the multiple masks associated with that layer.

The group constraint generator 230 may then move on to the next feature, such as feature 101 in cell 303. As previously noted, the group constraint generator 230 may determine the group constraints by assigning a group constraint for an $n^{th}$ feature of the features based on previously assigned group constraints for $1^{st}$ through $(n-1)^{th}$ features of the features within the cell. In other words, the group constraint generator 230 may propagate the logical operation defined by the group constraint of one feature to other features within the cell by basing the group constraint of one feature on a group constraint of another feature. For example, the group constraint generator 230 may determine a group constraint G2 for feature 101 based on the previously assigned group constraint G1 of feature 111. Specifically, the group constraint generator 230 may determine that the group constraint G2 for feature 101 cannot share a group with group constraint G1 of feature 111 because of the distance constraint d2 between features 101 and 111. In other words, in the example of FIG. 3, group constraint G2 restricts feature 101 from being assignable to Group A, which means that the only groups that are assignable to feature 101 are Groups B and C. As such, the group constraint generator 230 may limit feature 101 to either Group B or Group C, and may thus determine that the group constraint G2 for feature 101 may have the logical operation G2=GrpB∥GrpC, where ∥ denotes a logical OR operation.

The group constraint generator 230 may then move on to the next feature, such as feature 121 in cell 303. For example, the group constraint generator 230 may determine a group constraint G3 for feature 121 based on the previously assigned group constraints G1, G2 of features 111, 101. Specifically, the group constraint generator 230 may determine that the group constraint G3 for feature 121 cannot share a group with group constraint G1 of feature 111 and group constraint G4 of feature 102 because of the distance constraint d3 between features 121 and 111 and distant constraint d5 between features 121 and 102. In other words, in the example of FIG. 3, group constraint G3 restricts feature 121 from being assignable to Group A and whichever group is assignable by group constraint G4 to feature 102. This means the only groups that are available to feature 121 are either Group B and no group that is assignable to feature 102 or Group C and no group that is assignable to feature 102. As such, the group constraint generator 230 may determine that the group constraint G3 for feature 121 may have the logical operation G3=GrpB×!(G.F102)∥GrpC×!(G.F102), where × denotes a logical AND operation, ! denotes a logical NOT operation, and G.F102 denotes groups that are assignable to feature 102.

The group constraint generator 230 may then move on to the next feature, such as feature 102 in cell 303. For example, the group constraint generator 230 may determine a group constraint G4 for feature 102 based on the previously assigned group constraint G1, G2, G3 of features 111, 101, 121. Specifically, the group constraint generator 230 may determine that the group constraint G4 for feature 102 cannot share a group with group constraint G1 of feature 111 and group constraint G3 of feature 121 because of the distance constraint d4 between features 102 and 111 and distant constraint d5 between features 102 and 121. In other words, in the example of FIG. 3, group constraint G4 restricts feature 102 from being assignable to Group A and whichever group is assignable by group constraint G3 to feature 121. This means the only groups that are available to feature 102 are either Group B and no group that is assignable to feature 121 or Group C and no group that is assignable to feature 121. As such, the group constraint generator 230 may determine that the group constraint G4 for feature 102 may have the logical operation G4=GrpB×!(G.F121)∥GrpC×!(G.F121), where G.F121 denotes groups that are assignable to feature 121.

Once the group constraint generator 230 determines the group constraints for all of the features within the cell, the group constraint generator 230 may code the group constraints G1, G2, G3, G4 into the respective features 111, 101, 121, 102, and store the now coded cell 303 having the coded features in the coded cell library 212.

Figure 4:
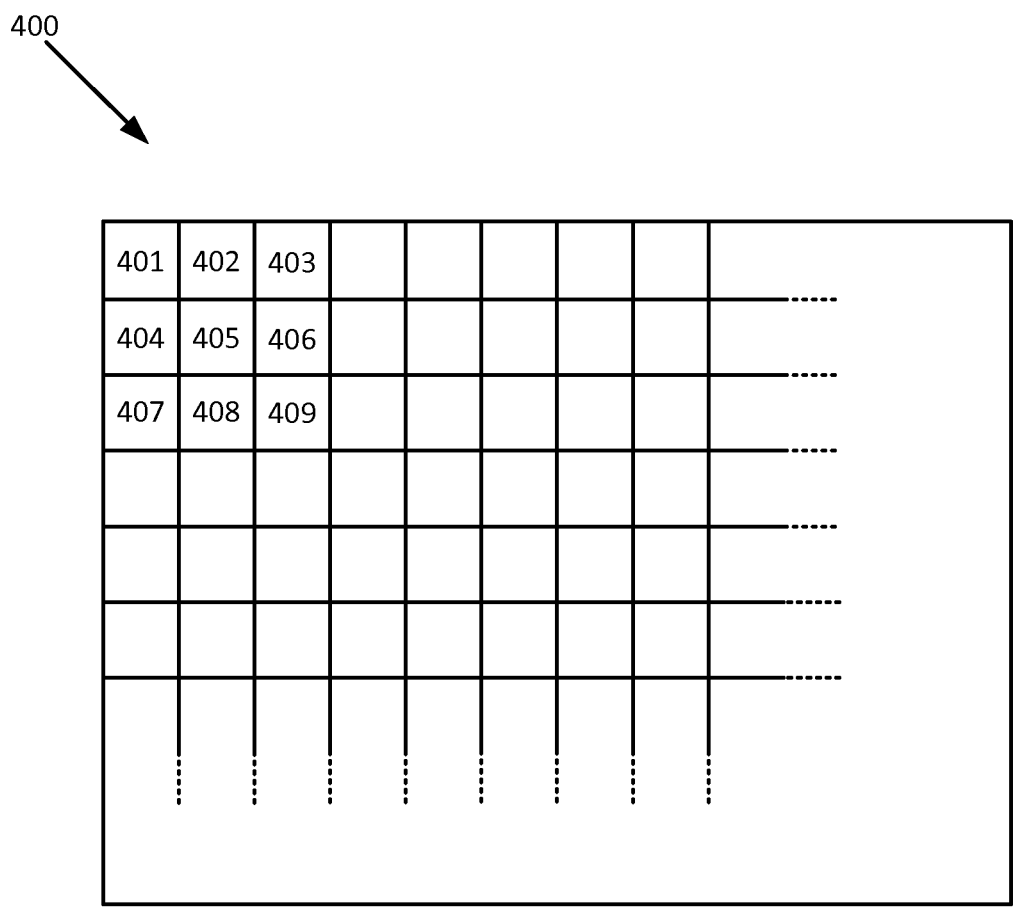
FIG. 4 is a diagram conceptually illustrating an example of an IC layout including abutting cells.

FIG. 4 is a diagram conceptually illustrating an example of an IC layout template 400 including a plurality of abutting cells 401-409. Although the IC layout template 400 only shows abutting cells 401-409, the IC layout template may include any number of cells (e.g., thousands of cells). In one aspect, the IC layout 400 may be a layout with previously coded cells (e.g., cells having features with previously assigned group constraints) that the group constraint generator 230 may retrieve from the coded cell library 212. In another aspect, the IC layout 400 may be a layout with uncoded cells (e.g., cells having features with no assigned group constraints) that the group constraint generator 230 may retrieve from the cell library 211. In the case the IC layout 400 includes uncoded cells, the group constraint generator 230 may populate the layout template with coded cells from the coded cell library 212 such that each of the cells (e.g., at least cells 401-409) in the layout template is replaced with respective coded cells, each of which includes features with assigned group constraints.

As previously noted, the feature analyzer 220 together with the group constraint generator 230 may determine whether there are any conflicts between group constraints of abutting cells, and thereafter the group constraint generator 230 may resolve the conflicts by configuring the group constraints of abutting cells. Some aspects of the resolution of such conflicts are illustrated in FIGS. 5A-5C.

Figure 5A:
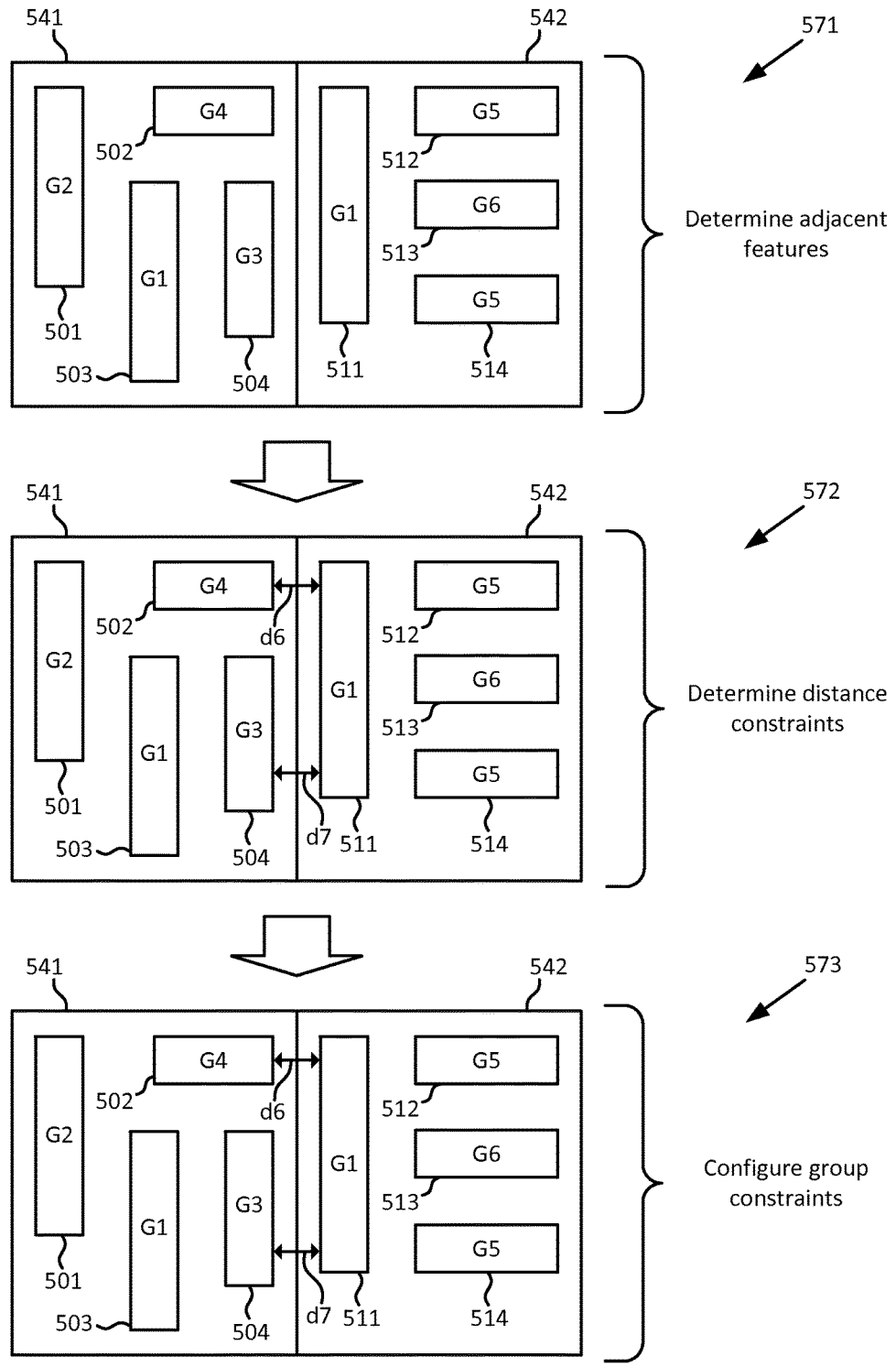
FIG. 5A is a flow diagram conceptually illustrating a first example of a method of configuring group constraints of features in abutting cells during a multi-patterning lithography process.
Figure 5B:
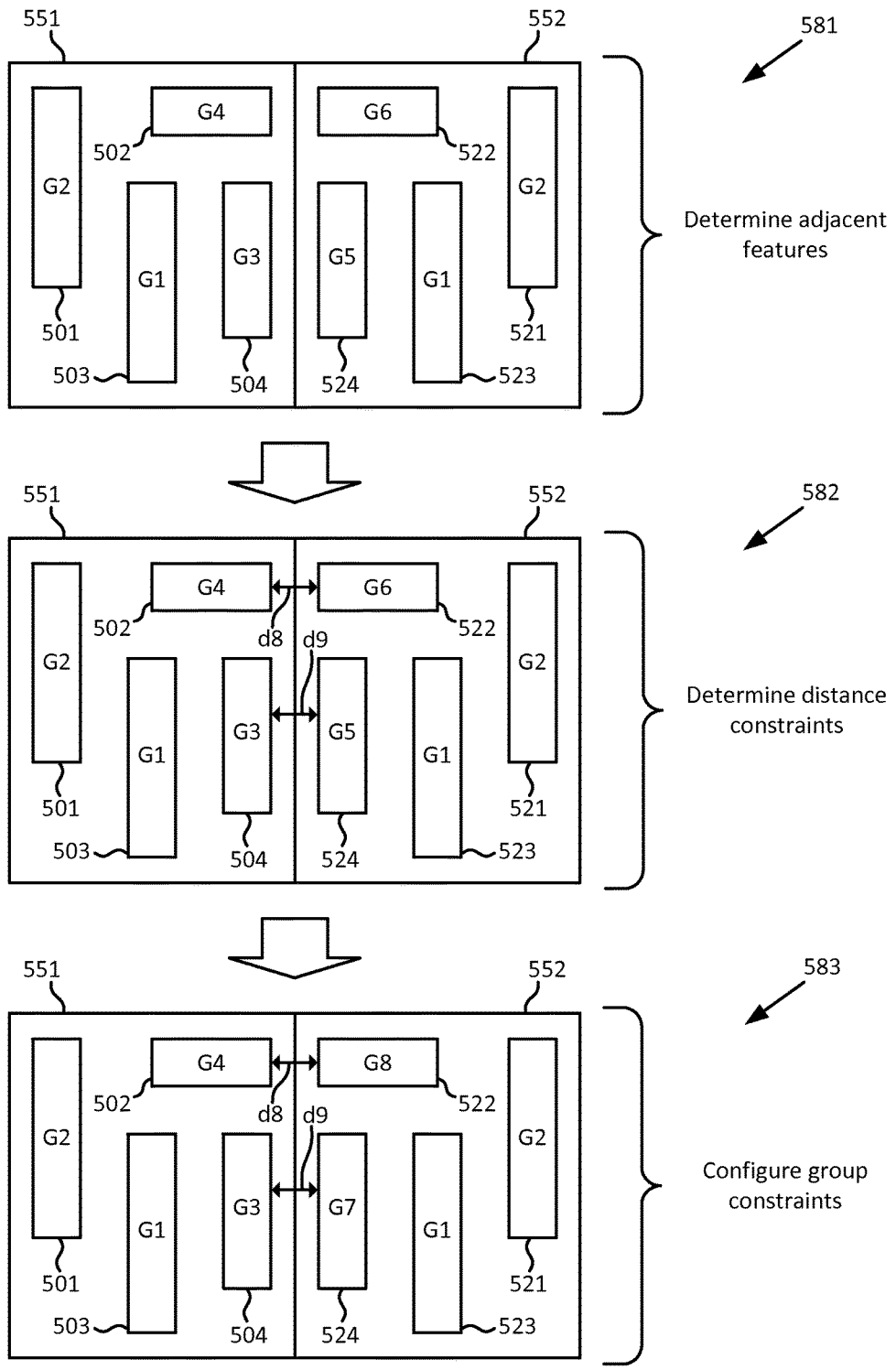
FIG. 5B is a flow diagram conceptually illustrating a second example of a method of configuring group constraints of features in abutting cells during a multi-patterning lithography process.
Figure 5C:
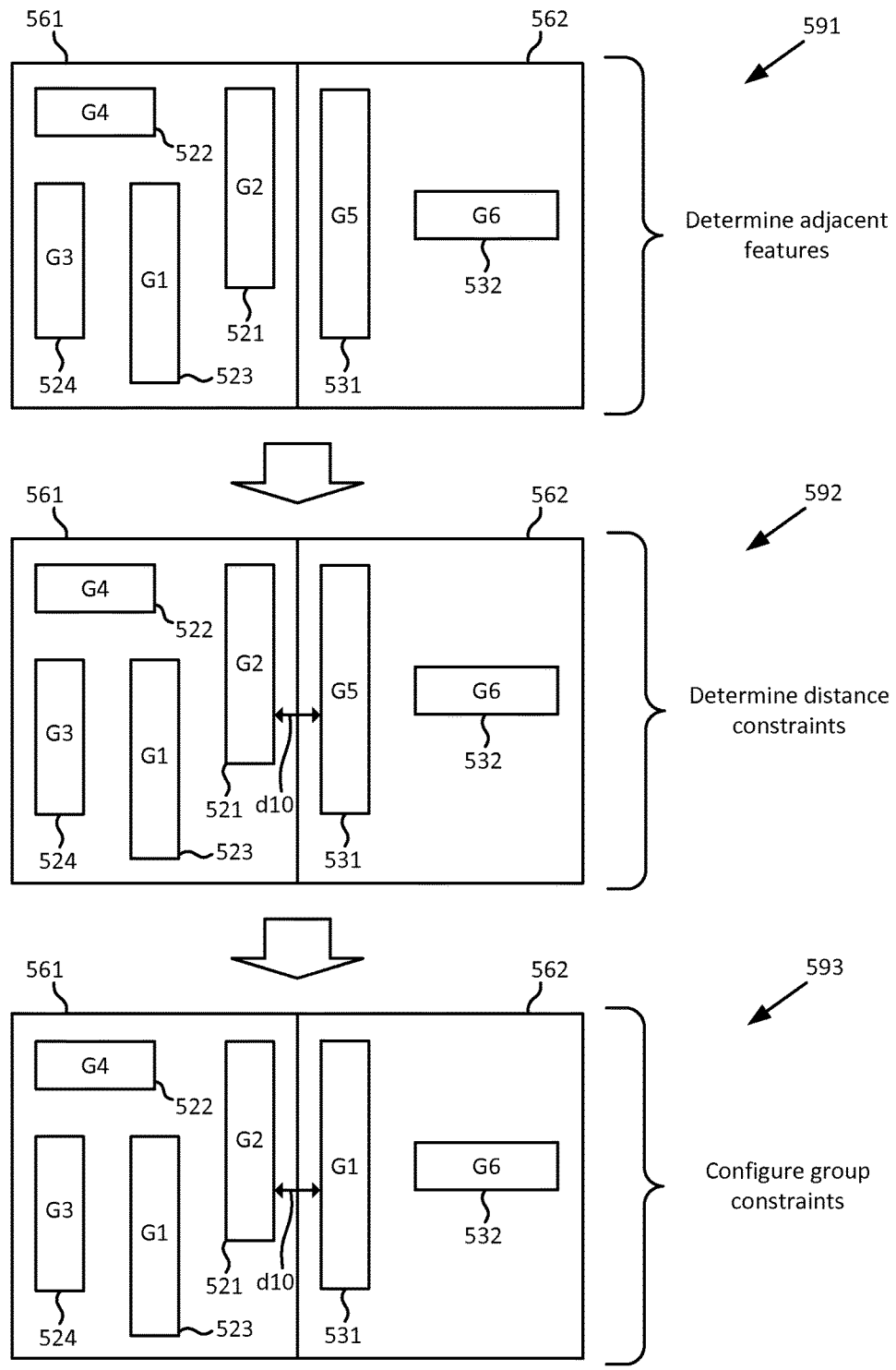
FIG. 5C is a flow diagram conceptually illustrating a third example of a method of configuring group constraints of features in abutting cells during a multi-patterning lithography process.

FIG. 5A is a flow diagram conceptually illustrating a first example of a method of configuring group constraints of features in abutting cells during a multi-patterning lithography process. As illustrative in FIG. 5A, the features in cell 541 are generally non-symmetric to the features on cell 542. Cells 541 and 542 may correspond to cells 401 and 402, respectively, of IC layout 400 in FIG. 4. As illustrated in FIG. 5A, first abutting cell 541 may include features 501, 502, 503, 504 having group constraints G2, G4, G1, G3, respectively. Second abutting cell 542 may include features 511, 512, 513, 514 having group constraints G1, G5, G6, G5, respectively.

The feature analyzer 220, in block 571, may determine which features of cell 541 and cell 542 are adjacent. For example, the feature analyzer 220 may determine that feature 502 of cell 541 is adjacent feature 511 of cell 542 and that feature 504 of cell 541 is also adjacent feature 511 of cell 542. The feature analyzer 220, in block 572, may then determine distance constraints for each of the adjacent features by determining/measuring the spacing distance between each of the adjacent features and determining whether the distances are less than the threshold spacing distance. For example, the feature analyzer 220 may determine that a distance d6 between features 502 and 511 is less than the threshold spacing distance, thus designating distance d6 as a distance constraint. The feature analyzer 220 may further determine that a distance d7 between features 504 and 511 is less than the threshold spacing distance, thus designating distance d7 as a distance constraint.

Based on the distance constraints, the group constraint generator 230 may determine whether there are any group constraint conflicts between features 502, 504 of cell 541 and feature 511 of cell 542. Once the group constraint generator 230 determines that a group constraint conflict exists between features of abutting cells, the group constraint generator 230, in block 573, may configure one or more of the group constraints of one of the cells to resolve the conflict.

For example, in block 573, the group constraint generator 230 may determine that G1=GrpA; G2=GrpB∥GrpC; G3=GrpB×!(G.F502)∥GrpC×!(G.F502); G4=GrpB×!(G.F504)∥GrpC×!(G.F504); G5=GrpB×!(G.F513)∥GrpC×!(G.F513); and G6=GrpB×!(G.F512)×!(G.F514)∥GrpC×!(G.F512)×!(G.F514). G.F502 denotes groups that are assignable to feature 502; G.F504 denotes groups that are assignable to feature 504; G.F512 denotes groups that are assignable to feature 512; G.F513 denotes groups that are assignable to feature 513; and G.F514 denotes groups that are assignable to feature 514.

Based on the logical operations of group constraints G1, G3, and G4, the group constraint generator 230 may thus determine that group constraint G1 of feature 511 does not conflict with either group constraint G4 of feature 502 or group constraint G3 of feature 504. As such, the group constraint generator 230 may leave the group constraints of the features of cells 541 and 542 unaltered.

The group constraint generator 230 may then determine that there are no group constraint conflicts between abutting cells 541 and 542 and may proceed to analyze other abutting cells, such as another cell that is abutting cell 542, and may reconfigure the group constraints of this other cell in order to resolve any group constraint conflicts between the abutting cells.

FIG. 5B is a flow diagram conceptually illustrating a second example of a method of configuring group constraints of features in abutting cells during a multi-patterning lithography process. As illustrated in FIG. 5B, first abutting cell 551 may include features 501, 502, 503, 504 having group constraints G2, G4, G1, G3, respectively. Second abutting cell 552 may include features 521, 522, 523, 524 having group constraints G2, G6, G1, G5, respectively.

The feature analyzer 220, in block 581, may determine which features of cell 551 and cell 552 are adjacent. For example, the feature analyzer 220 may determine that feature 502 of cell 551 is adjacent feature 522 of cell 552 and that feature 504 of cell 551 is adjacent feature 524 of cell 552. The feature analyzer 220, in block 582, may then determine distance constraints for each of the adjacent features by determining/measuring the spacing distance between each of the adjacent features and determining whether the distances are less than the threshold spacing distance. For example, the feature analyzer 220 may determine that a distance d8 between features 502 and 522 is less than the threshold spacing distance, thus designating distance d8 as a distance constraint. The feature analyzer 220 may further determine that a distance d9 between features 504 and 524 is less than the threshold spacing distance, thus designating distance d9 as a distance constraint.

Based on the distance constraints, the group constraint generator 230 may determine whether there are any group constraint conflicts between features 502 and 522 and between features 504 and 524. Once the group constraint generator 230 determines that a group constraint conflict exists between features of abutting cells, the group constraint generator 230, in block 583, may configure one or more of the group constraints of one of the cells to resolve the conflict.

For example, in block 583, the group constraint generator 230 may determine that G1=GrpA; G2=GrpB∥GrpC; G3=GrpB×!(G.F502)∥GrpC×!(G.F502); G4=GrpB×!(G.F504)∥GrpC×!(G.F504); G5=GrpB×!(G.F522)∥GrpC×!(G.F522); and G6=GrpB×!(G.F524)∥GrpC×!(G.F524). G.F502 denotes groups that are assignable to feature 502; G.F504 denotes groups that are assignable to feature 504; G.F522 denotes groups that are assignable to feature 522; and G.F524 denotes groups that are assignable to feature 524.

Based on the logical operations of group constraints G3, G4, G5 and G6, the group constraint generator 230 may thus determine that group constraint G4 of feature 502 conflicts with group constraint G6 of feature 522, and that group constraint G3 of feature 504 conflicts with group constraint G5 of feature 524. The group constraint generator 230 may then reconfigure the group constraints of either cell 551 or 552. In one aspect, the group constraint generator 230 may configure the group constraints of features 522 and 524 of cell 552. For example, the group constraint generator 230 may configure the group constraint G5 of feature 524 by adding a new exception to the group constraint that further restricts feature 524 from being assigned any group that is assignable to feature 504. Specifically, the group constraint generator 230 may add a logical operation of "×!(G.F504)" to the group constraint of feature 524, essentially creating a new group constraint G7=GrpB×!(G.F522)×!(G.F504)||GrpC×!(G.F522)×!(G.F504). Additionally, the group constraint generator 230 may configure the group constraint G6 of feature 522 by adding a new exception to the group constraint that further restricts feature 522 from being assigned any group that is assignable to feature 502. Specifically, the group constraint generator 230 may add a logical operation of "×!(G.F502)" to the group constraint of feature 522, essentially creating a new group constraint G8=GrpB×!(G.F524)×!(G.F502)||GrpC×!(G.F524)×!(G.F502).

The group constraint generator 230 may then determine that the group constraint conflicts are resolved between abutting cells 551 and 552 and may proceed to analyze other abutting cells, such as another cell that is abutting cell 552, and may reconfigure the group constraints of this other cell in order to resolve any group constraint conflicts between the abutting cells.

FIG. 5C is a flow diagram conceptually illustrating a third example of a method of configuring group constraints of features in abutting cells during a multi-patterning lithography process. As illustrated in FIG. 5C, first abutting cell 561 may include features 521, 522, 523, 524 having group constraints G2, G4, G1, G3, respectively. Second abutting cell 562 may include features 531, 532 having group constraints G5 (e.g., G5=GrpA||GrpB||GrpC), G6 (e.g., G6=!(G.F531)), respectively.

The feature analyzer 220, in block 591, may determine which features of cell 561 and cell 562 are adjacent. For example, the feature analyzer 220 may determine that feature 521 of cell 561 is adjacent feature 531 of cell 562. The feature analyzer 220, in block 592, may then determine distance constraints for each of the adjacent features by determining/measuring the spacing distance between each of the adjacent features and determining whether the distances are less than the threshold spacing distance. For example, the feature analyzer 220 may determine that a distance d10 between features 521 and 531 is less than the threshold spacing distance, thus designating distance d10 as a distance constraint.

Based on this distance constraint, the group constraint generator 230 may determine whether there are any group constraint conflicts between features 521 and 531. Once the group constraint generator 230 determines that a group constraint conflict exists between features of abutting cells, the group constraint generator 230, in block 593, may configure one or more of the group constraints of one of the cells to resolve the conflict. For example, in block 593, the group constraint generator 230 may determine that G1=GrpA; G2=GrpB||GrpC; G3=GrpB×!(G.F522)||GrpC×!(G.F522); G4=GrpB×!(G.F524)||GrpC×!(G.F524); G5=GrpA||GrpB||GrpC; and G6=!(G.F531). G.F522 denotes groups that are assignable to feature 522; G.F524 denotes groups that are assignable to feature 524; and G.F531 denotes groups that are assignable to feature 531.

Based on the logical operations of group constraints G3 and G4, the group constraint generator 230 may thus determine that group constraint G5 of feature 531 conflicts with group constraint G2 of feature 521. The group constraint generator 230 may then reconfigure the group constraints of either cell 561 or 562. In one aspect, the group constraint generator 230 may narrow the group constraint of feature 531 of the second cell 562 by eliminating at least one group from being assignable to the feature 531. For example, the group constraint generator 230 may eliminate Groups B and C from the group constraint G5 such that group constraint G5 is limited to only Group A. In an aspect, the group constraint generator 230 may configure feature 531 such that feature 531 is assigned group constraint G1 instead of group constraint G5, where G1=GrpA.

The group constraint generator 230 may then determine that the group constraint conflicts are resolved between abutting cells 561 and 562 and may proceed to analyze other abutting cells, such as another cell that is abutting cell 562, and may reconfigure the group constraints of this other cell in order to resolve any group constraint conflicts between the abutting cells.

Figure 5D:
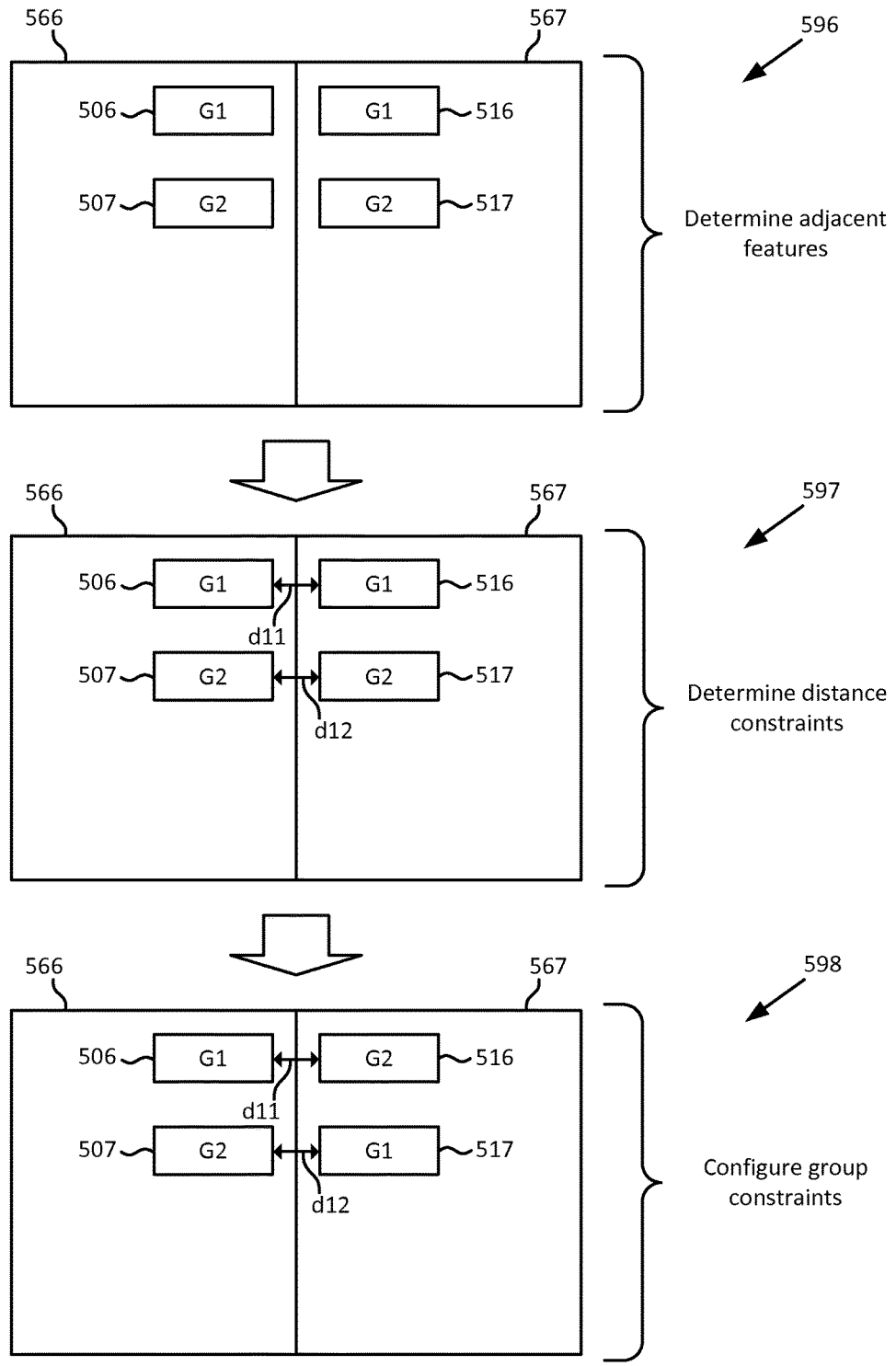
FIG. 5D is a flow diagram conceptually illustrating a fourth example of a method of configuring group constraints of features in abutting cells during a multi-patterning lithography process.

FIG. 5D is a flow diagram conceptually illustrating a fourth example of a method of configuring group constraints of features in abutting cells during a multi-patterning lithography process. As illustrated in FIG. 5D, first abutting cell 566 may include features 506, 507 having group constraints G1, G2, respectively. Second abutting cell 567 may include features 516, 517 having group constraints G1, G2, respectively.

The feature analyzer 220, in block 596, may determine which features of cell 566 and cell 567 are adjacent. For example, the feature analyzer 220 may determine that feature 506 of cell 566 is adjacent feature 516 of cell 567 and that feature 507 of cell 566 is adjacent feature 517 of cell 567. The feature analyzer 220, in block 597, may then determine distance constraints for each of the adjacent features by determining/measuring the spacing distance between each of the adjacent features and determining whether the distances are less than the threshold spacing distance. For example, the feature analyzer 220 may determine that a distance d11 between features 506 and 516 is less than the threshold spacing distance, thus designating distance d11 as a distance constraint. The feature analyzer 220 may further determine that a distance d12 between features 507 and 517 is less than the threshold spacing distance, thus designating distance d12 as a distance constraint.

Based on the distance constraints, the group constraint generator 230 may determine whether there are any group constraint conflicts between features 506 and 516 and between features 507 and 517. Once the group constraint generator 230 determines that a group constraint conflict exists between features of abutting cells, the group constraint generator 230, in block 598, may configure one or more of the group constraints of one of the cells to resolve the conflict.

For example, in block 598, the group constraint generator 230 may determine that G1=GrpA; and G2=GrpB||GrpC.

Based on the logical operations of group constraints G1 and G2, the group constraint generator 230 may thus determine that group constraint G1 of feature 506 conflicts with group constraint G1 of feature 516, and that group constraint G2 of feature 507 conflicts with group constraint G2 of feature 517. The group constraint generator 230 may then reconfigure the group constraints of either cell 566 or 567. In one aspect, the group constraint generator 230 may swap a group of one feature with a group of another feature within the cell 567. For example, the group constraint generator 230 may swap the group constraints of features 516 and 517 such that feature 516 is configured to have group constraint G2 and feature 517 is configured to have group constraint G1.

The group constraint generator 230 may then determine that the group constraint conflicts are resolved between abutting cells 566 and 567 and may proceed to analyze other abutting cells, such as another cell that is abutting cell 567, and may reconfigure the group constraints of this other cell in order to resolve any group constraint conflicts between the abutting cells.

Figure 6:
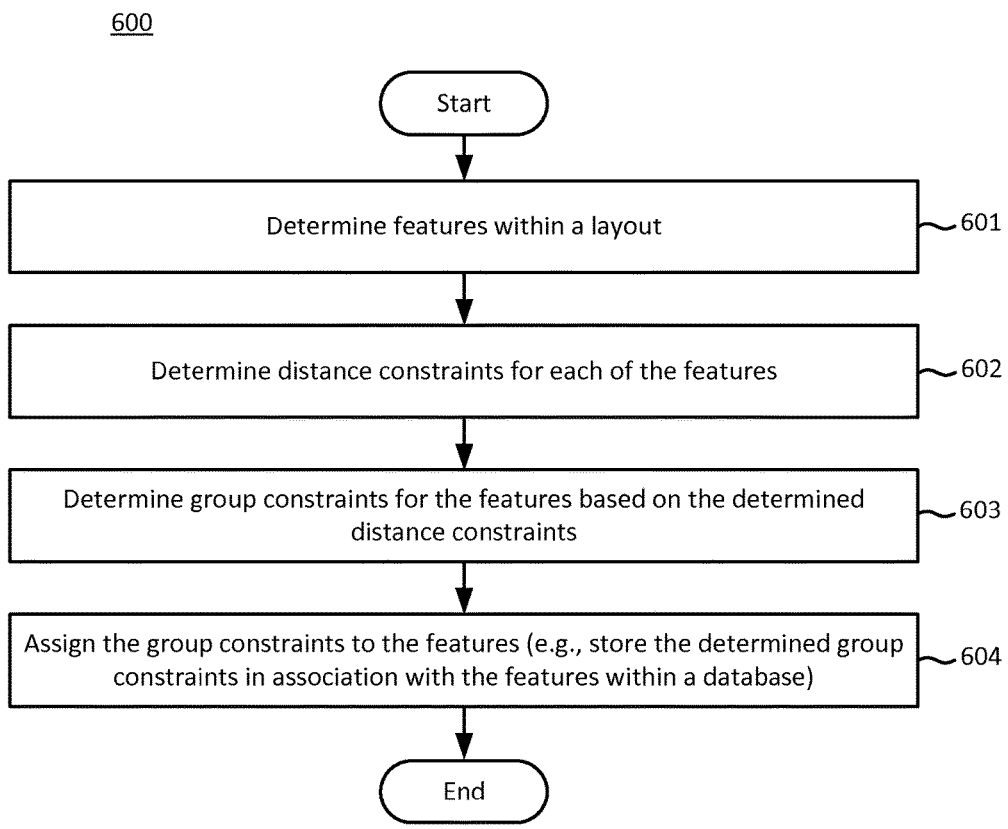
FIG. 6 is a flowchart conceptually illustrating an example of a method of determining group constraints of features during a multi-patterning lithography process.

FIG. 6 is a flowchart conceptually illustrating an example of a method 600 of determining group constraints of features during a multi-patterning lithography process. Referring to FIG. 2, in an operational aspect, the apparatus 200 may perform various aspects of the method 600. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein. Moreover, it should be understood that the following actions or functions may be performed by a specially-programmed processor, a processor executing specially-programmed software or computer-readable media, or by any other combination of a hardware component and/or a software component capable of performing the described actions or functions.

In an aspect, at block 601, features within a layout may be determined. The layout may support abutment methodologies and may include at least one of a cell, a standard cell, a programmable cell, a layout template, a layout fabric, etc. In one configuration, the feature analyzer 220 may retrieve a cell from a cell library 211 and determine what features are in the cell.

At block 602, distance constraints for each of the features may be determined. For example, in an aspect, the feature analyzer 220 may determine the distance constraints between each of the features in the cell. Specifically, the feature analyzer 220 may determine a spacing distance between each of the features and determine whether the spacing distance is less than a threshold spacing distance.

At block 603, group constraints for the features may be determined based on the distance constraints. For example, in an aspect, the group constraint generator 230 may determine group constraints for the features based on the determined distance constraints. The group constraints may define limits on groups assignable to each of the features. In one configuration, the group constraints may be further determined based on previously assigned group constraints, thereby propagating the logical operation of the group constraint of one feature to other features within the cell. For example, the group constraint generator 230 may determine a number of distance constraints for each of the features, and assign a group constraint to a first feature of the features with a largest or maximum number of distance constraints. In one configuration, the group constraint generator 230 may assign a group constraint for an $n^{th}$ feature of the features based on previously assigned group constraints for $1^{st}$ through $(n-1)^{th}$ features of the features. The group constraint generator 230 may code the group constraints for each feature as a logical operation using, for example, Boolean algebra. The equation may logically define limits on groups assignable to each of the features.

At block 604, the determined group constraints may be assigned to the features. In one example, assigning the group constrains to the features includes storing the determined group constraints in association with the features within a database. For example, once the group constraint generator 230 determines the group constraints for all the features within the cell and codes the respective group constraints into the respective features, the group constraint generator 230 may store the now coded cell having the coded features (with assigned group constraints) in the coded cell library 212.

Figure 7:
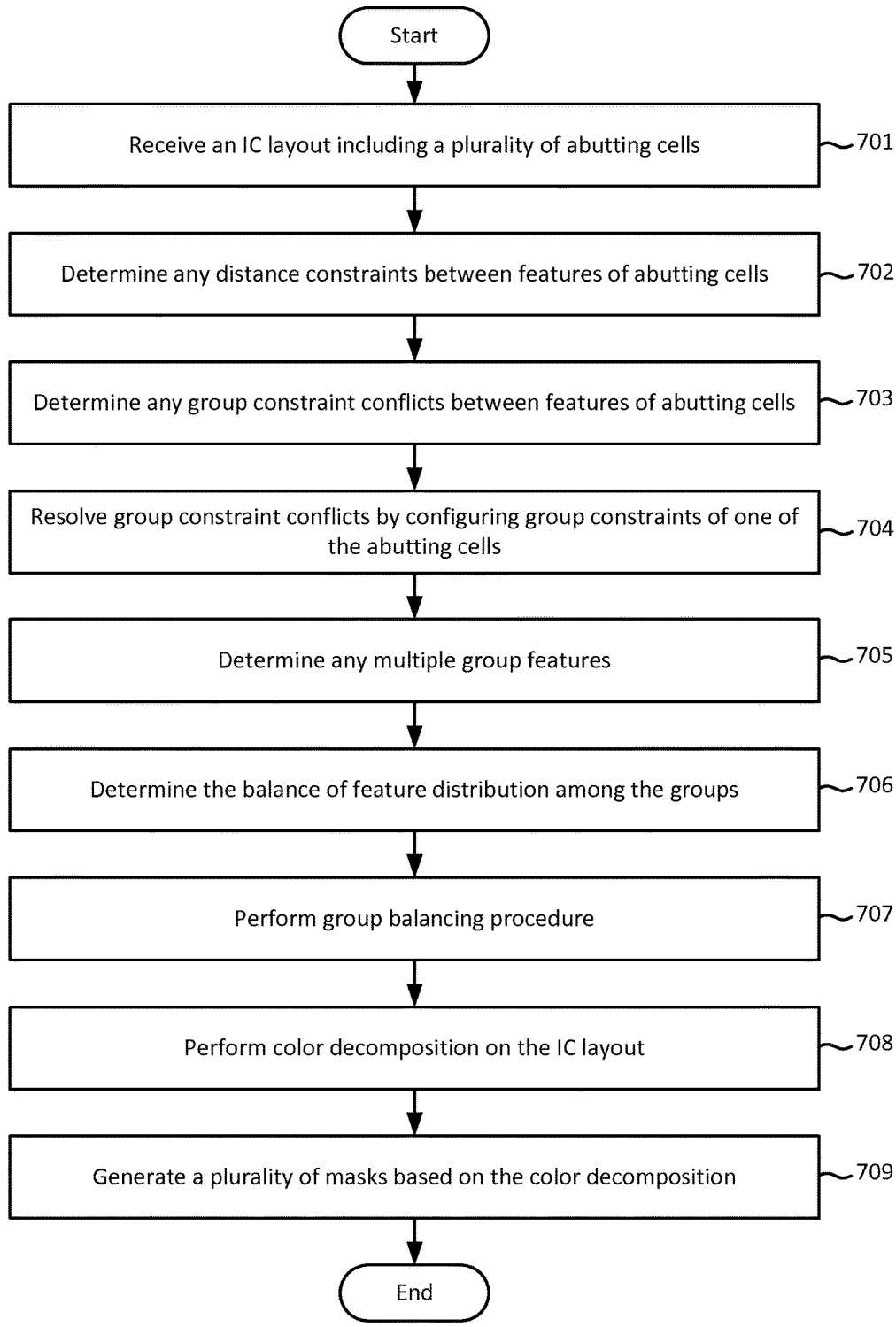
FIG. 7 is a flowchart conceptually illustrating an example of a method of determining group constraints of features in abutting cells during a multi-patterning lithography process.

FIG. 7 is a flowchart conceptually illustrating an example of a method 700 of determining group constraints of features in abutting cells during a multi-patterning lithography process. Referring to FIG. 2, in an operational aspect, the apparatus 200 may perform various aspects of the method 700.

In an aspect, at block 701, an IC layout with a plurality of abutting cells may be received. For example, in one configuration, the group constraint generator 230 may retrieve an IC layout with a plurality of abutting coded cells from the coded cell library 212. In another configuration, the group constraint generator 230 may retrieve an IC layout template with a plurality of abutting uncoded cells from the cell library 211, and then populate the layout template with coded cells from the coded cell library 212 such that each of the cells in the layout template is replaced with respective coded cells.

In an aspect, at block 702, any distance constraints between features of abutting cells may be determined. For example, the feature analyzer 220 may determine that a second cell feature of a second cell has a distance constraint with a first cell feature of an abutting first cell. In a configuration, referring to FIG. 5B, the feature analyzer 220 may determine that a distance d6 between features 502 and 511 of abutting cells 551 and 552 is less than the threshold spacing distance, and that a distance d7 between features 504 and 524 is less than the threshold spacing distance.

In an aspect, at block 703, any group constraint conflicts between features of abutting cells may be determined. For example, the group constraint generator 230 may determine whether group constraints of the second cell conflict with group constraints of the abutting first cell. In a configuration, referring to FIG. 5D, the group constraint generator 230 may determine based on the distance constraints whether there are any group constraint conflicts between cell 566 and cell 567, and more specifically, between features 506 and 516 and between features 507 and 517. For example, based on the logical operations of group constraints G1 and G2, the group constraint generator 230 may determine that group constraint G1 of feature 506 conflicts with group constraint G1 of feature 516, and that group constraint G2 of feature 507 conflicts with group constraint G2 of feature 517.

In an aspect, at block 704, group constraint conflicts may be resolved by configuring group constraints of one of the abutting cells or in some cases both of the abutting cells. For example, the group constraint generator 230 may configure one or more of the group constraints of one of the cells to resolve the conflict. In a configuration, referring to FIG. 5D, the group constraint generator 230 may reconfigure the group constraints of either cell 566 or 567. For example, the group constraint generator 230 may configure the group constraints of only cell 567 by swapping the group constraints of features 516 and 517 such that feature 516 is configured to have group constraint G2 and feature 517 is configured to have group constraint G1. The group constraint generator 230 may thus resolve any group conflicts between every abutting cell in the IC layout.

In an aspect, at block 705, any multiple group features may be determined. For example, the group constraint generator 230 may determine which of the features in the IC layout are multiple group features having coded group constraints that allow the features to be assigned to two or more groups. For example, the group constraint generator 230 may determine that features having group constraint G2=GrpB∥GrpC are multiple group features because they are assignable to either Group B or Group C.

In an aspect, at block 706, the balance of feature distribution among the groups may be determined. For example, the group constraint generator 230 may determine the balance of feature distribution among the plurality of groups by determining the number of features assigned to each group, as well as the area occupied by the features assigned to each group.

In an aspect, at block 707, a group balancing procedure may be performed if it is determined that the feature distribution is not balanced. For example, the group constraint generator 230 may assign each of the multiple group features to a group with the lowest feature count and/or a group with a smallest feature area such that the feature count and feature area of each respective group is balanced among the groups.

In an aspect, at block 708, color decomposition may be performed on the IC layout. For example, the decomposer 240 may retrieve the IC layout from the coded cell library 212 or receive the IC layout from the group constraint generator 230, and execute a decomposition algorithm on the IC layout. The decomposition algorithm may assign different colors to the uncolored features of the IC layout based on the group constraints assigned to each of the features by the group constraint generator 230, until all features in the IC layout are assigned a color. For example, with reference to FIG. 5A, the group constraints are G1=GrpA; G2=GrpB∥GrpC; G3=GrpB×!(G.F502)∥GrpC×!(G.F502); G4=GrpB×!(G.F504)∥GrpC×!(G.F504); G5=GrpB×!(G.F513)∥GrpC×!(G.F513); and G6=GrpB×!(G.F512)×!(G.F514)∥GrpC×!(G.F512)×!(G.F514). Assume GrpA is the color red, GrpB is the color yellow, and GrpC is the color green. During color decomposition, the decomposer 240 may assign G1 to red, G2 to yellow (selecting GrpC of GrpB∥GrpC), G3 to green (selecting GrpC×!(G.F502) of GrpB×!(G.F502)∥GrpC×!(G.F502)), G4 to yellow (selecting GrpB×!(G.F504) due to the previous assignment of GrpC (yellow) to feature 504), G5 to green (selecting GrpC×!(G.F513) or GrpB×!(G.F513)∥GrpC×!(G.F513)), and G6 to yellow (selecting GrpB×!(G.F512)×!(G.F514) due to the previous assignment of GrpC (green) to features 512 and 514).

In an aspect, at block 709, a plurality of masks may be generated based on the color decomposition. For example, the mask generator 250 may generate a design file used to generate multiple masks, each mask corresponding to a different color (e.g., red, yellow, green in the above example in relation to FIG. 5A). The design file may be based on the colored IC layout received from the decomposer 240, in a manner that writes features having the same color to the same mask.

Figure 8:
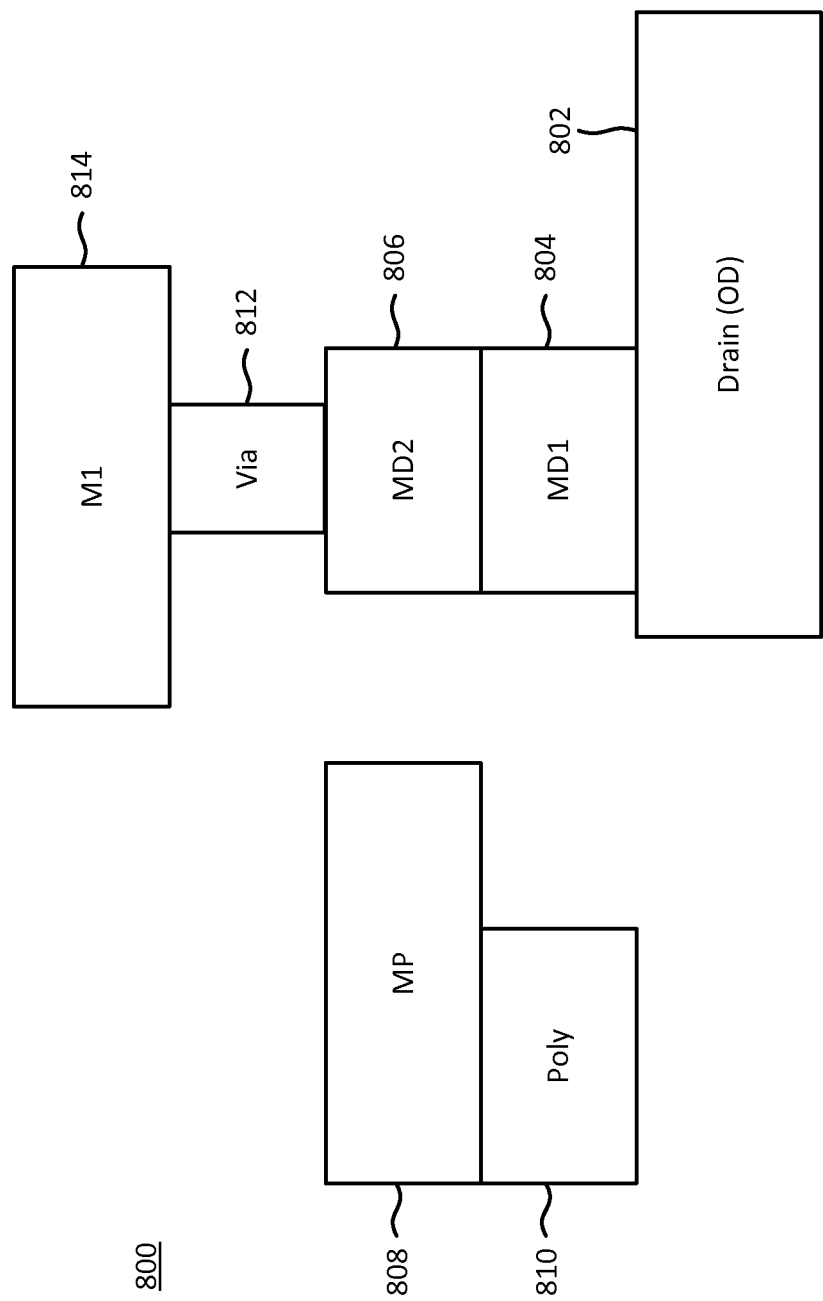
FIG. 8 is a diagram conceptually illustrating a side profile of various features that may be formed in a multi-patterning lithography process.

FIG. 8 is a diagram 800 conceptually illustrating a side profile of various features that may be formed in a multi-patterning lithography process. The POLY gate interconnect 810 may be a metal interconnect, such as in a 20 nm process technology. However, in other process technologies, the POLY gate interconnect 810 may be entirely polysilicon or may be polysilicon with a metal top layer. An MP layer interconnect 808 may contact the POLY gate interconnect 810. A first MD1 layer interconnect 804 may be on the drain 802 (also referred to as oxide diffusion (OD)), and a second MD2 layer interconnect 806 may be on the first MD1 layer interconnect 804. The first MD layer 804 and the second MD layer 806 may be referred to herein as just one MD layer. The MD layer may connect directly to a drain. The POLY gate interconnect 810 and the MD1 layer interconnect 804 are on the same layer. The MP layer interconnect 808 and the MD2 layer interconnect 806 are on the same layer. A via 812 may contact the MD2 layer interconnect 806. A metal one (M1) layer interconnect 814 may contact the via 812.

The exemplary methods and apparatuses assign group constraints to features in a circuit layout for a multi-patterning process. As described supra, the features may represent at least one of a metal interconnect, a power rail, a POLY gate interconnect, a via, an MP interconnect, or an MD interconnect. The features for which group constraints are applied in the exemplary methods and apparatuses may be on the same layer. As such, the exemplary apparatuses (and methods) may determine features and distance constraints, and may assign group constraints to features that are on the same layer, and may perform such processes for one or more of the layers. For example, the exemplary apparatuses (and methods) may determine features and distance constraints, and may assign group constraints to one or more POLY gate interconnects 810 and one or more MD1 layer interconnects 804 on the same layer. For another example, the exemplary apparatuses (and methods) may determine features and distance constraints, and may assign group constraints to one or more MP layer interconnects 808 and one or more MD2 layer interconnects 806 on the same layer. For another example, the exemplary apparatuses (and methods) may determine features and distance constraints, and may assign group constraints to one or more vias 812 on the same layer. For yet example, the exemplary apparatuses (and methods) may determine features and distance constraints, and may assign group constraints to one or more M1 layer interconnects 814 on the same layer.

Figure 9:
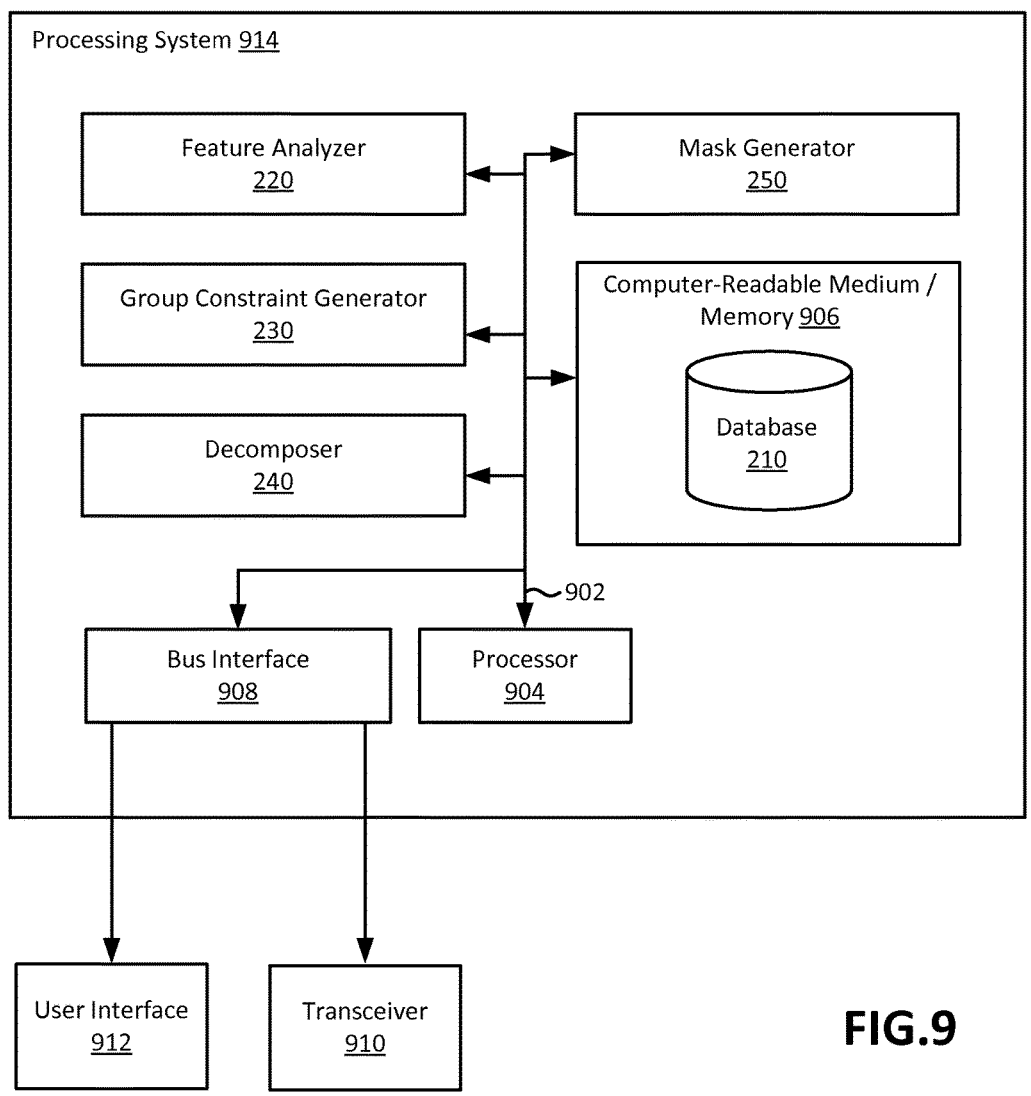
FIG. 9 is a diagram conceptually illustrating an example of a hardware implementation for an apparatus employing a processing system configured for determining and configuring group constraints of features during a multi-patterning lithography process.

FIG. 9 is a diagram conceptually illustrating an example of a hardware implementation for an apparatus 900 employing a processing system 914 configured for determining and configuring group constraints of features during a multi-patterning lithography process. The apparatus 900 may correspond to the apparatus 200 of FIG. 2. In this example, the processing system 914 may be implemented with a bus architecture, represented generally by the bus 902. The bus 902 may include any number of interconnecting buses and bridges depending on the specific application of the processing system 914 and the overall design constraints. The bus 902 may link together various circuits including one or more processors, represented generally by the processor 904, and computer-readable media, represented generally by the computer-readable medium/memory 906. The bus 902 may also link feature analyzer 220, group constraint generator 230, decomposer 240, and mask generator 250 to processor 904, and computer-readable medium/memory 906, which may include the database 210. The bus 902 may also link various other circuits such as timing sources, peripherals, voltage regulators, and power management circuits, which are well known in the art, and therefore, will not be described any further. A bus interface 908 may provide an interface between the bus 902 and a transceiver 910. The transceiver 910 may provide a means for communicating with various other apparatus over a transmission medium. A user interface 912 (e.g., keypad, display, speaker, microphone, joystick) may also be provided.

The processor 904 is responsible for managing the bus 902 and general processing, including the execution of software stored on the computer-readable medium 906. The software, when executed by the processor 904, causes the processing system 914 to perform the various functions described infra for any particular apparatus. The computer-readable medium 906 may also be used for storing data that is manipulated by the processor 904 when executing software.

In an aspect, the feature analyzer 220, group constraint generator 230, decomposer 240, and mask generator 250 may be implemented by software or computer-executable codes stored in computer-readable medium and executed on processor 904, and/or by processor modules within processor 904. The feature analyzer 220, group constraint generator 230, decomposer 240, and mask generator 250 may each perform various functionality, as described herein, for example and particularly with respect to the series of steps each may perform as described, for example, with respect to FIG. 2.

In one configuration, the apparatus (e.g., one or more of the components of the processing system 914) may include means for determining features within the circuit layout. The apparatus may further include means for determining distance constraints for at least one of the features. The apparatus may further include means for determining group constraints for the features based on the distance constraints. The group constraints define limits on groups assignable to each of the features. The apparatus may further include means for assigning the group constraints to the features. In one configuration, the means for determining the distance constraints is configured to determine a spacing distance between adjacent features within the circuit layout. In one configuration, the means for determining the distance constraints is configured to determine the distance constraints based on whether the spacing distance between at least two of the features is less than a threshold spacing distance. In one configuration, the means for determining the group constraints is configured to determine a number of distance constraints for at least one of the features, to assign a first group constraint to a first feature of the features with a largest number of distance constraints, and to assign additional group constraints to remaining features of the features based on the first group constraint assigned to the first feature. In one configuration, the means for assigning additional group constraints to the remaining features of the features is configured to assign the group constraint for an $n^{th}$ feature of the features based on previously assigned group constraints for $1^{st}$ through $(n-1)^{th}$ features of the features. In one configuration, the means for determining the group constraints is configured to determine for at least one of the features an equation that logically defines limits on groups assignable to said at least one of the features.

In the same or another configuration, the apparatus may include means for receiving an integrated circuit layout including a plurality of abutting cells. The apparatus may further include means for determining whether group constraints of a first cell of the plurality of abutting cells conflict with group constraints of a second cell of the plurality of abutting cells. The first cell abuts the second cell. The apparatus may further include means for configuring a subset of the group constraints of the first cell based on the group constraints of the second cell and based on the group constraints of the first cell that conflict with the group constraints of the second cell. In one configuration, the means for determining whether group constraints of the first cell conflict with group constraints of the second cell is configured to determine that a first cell feature of the first cell has a distance constraint with a second cell feature of the second cell, and to determine that a group constraint of the first cell feature has at least one group in common with a group constraint of the second cell feature. In one configuration, the means for configuring the subset of the group constraints of the first cell based on the group constraint of the second cell is configured to change the group constraints of the first cell to resolve the conflict between the group constraints of the first cell and the group constraint of the second cell. In one configuration, the means for configuring the subset of the group constraints of the first cell based on the group constraints of the second cell is configured to swap one group for another group within the group constraints of the first cell. In one configuration, the means for configuring the subset of the group constraints of the first cell based on the group constraints of the second cell is configured to narrow the group constraints of the first cell by eliminating at least one group from being assignable to a second feature within the first cell. In one configuration, the apparatus may further include means for assigning a mask set of a plurality of mask sets, for processing the integrated circuit layout, to each feature of a second subset of the features based on the configured group constraints. In one configuration, the apparatus may further include means for assigning a mask set to each feature of a first subset of the features based on balancing the features across the plurality of mask sets. In one configuration, to balance the features, the means for assigning is configured to determine which of the features in the integrated circuit layout are multiple group features that are assigned to multiple groups based on the group constraints of the features, and to assign each of the multiple group features to a group of the multiple groups with at least one of a lowest feature count and a smallest feature area in a manner that balances the features across the plurality of mask sets.

As described supra, herein is provided an apparatus for determining group constraints of features within an IC layout during a multi-patterning lithography process. Generally, if features within a layout, a cell, or between abutting cells, etc., include distance constraints, the apparatus may determine group constraint (e.g., using logical Boolean algebra) for an $n^{th}$ feature of the features based on previously assigned group constraints for $1^{st}$ through $(n-1)^{th}$ features of the features until any group constraint conflicts are resolved. The apparatus may then balance feature distribution among the plurality of groups by taking into account the number of features assigned to each group, as well as the area occupied by the features assigned to each group. Determining the group constraints and balancing the features among the groups in this manner ensures a viable and resolvable color solution when decomposing IC layouts, preventing non-convergence of color decomposition, shortening color decomposition run times, as well as avoiding other issues such as color balance and color conflict.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field programmable gate array (FPGA), a programmable logic device (PLD), a state machine, gated logic, discrete hardware circuits, and other suitable processing component configured to perform the various functions described throughout this disclosure. The functionality of a processor, any portion of a processor, or any combination of processors presented in this disclosure may be implemented with software being executed by a microprocessor, microcontroller, DSP, or other suitable platform. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various embodiments presented throughout this disclosure, the memory may be internal to the processors (e.g., cache or register). A computer-readable medium may also include a carrier wave, a transmission line, or any other suitable medium for storing or transmitting software. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of assigning group constraints to features in a circuit layout for a multi-patterning process, comprising:
   determining features within the circuit layout;
   determining distance constraints for at least one of the features;
   determining, using a computer, group constraints for the features based on the distance constraints, the group constraints defining equations that logically define limits on groups assignable to each of the features; and
   assigning the group constraints to the features.

2. The method of claim 1, wherein determining the distance constraints comprises determining a spacing distance between adjacent features within the circuit layout.

3. The method of claim 2, wherein determining the distance constraints comprises determining the distance constraints based on whether the spacing distance between at least two of the features is less than a threshold spacing distance.

4. The method of claim 1, wherein the features are in a same layer of the circuit layout.

5. The method of claim 1, wherein each group of the groups is a different color, each color corresponding to a different mask set.

6. The method of claim 1, wherein the determining the group constraints includes:
   determining a number of distance constraints for at least one of the features; and
   assigning a first group constraint to a first feature of the features with a largest number of distance constraints; and
   assigning additional group constraints to remaining features of the features based on the first group constraint assigned to the first feature.

7. The method of claim 6, wherein the assigning additional group constraints to the remaining features of the features comprises:
   assigning the group constraint for an nth feature of the features based on previously assigned group constraints for 1st through (n−1)th features of the features.

8. An apparatus for assigning group constraints to features in a circuit layout for a multi-patterning process, comprising:
   a memory; and
   at least one processor coupled to the memory and configured to:
     determine features within the circuit layout;
     determine distance constraints for at least one of the features;
     determine group constraints for the features based on the distance constraints, the group constraints defining equations that logically define limits on groups assignable to each of the features; and
     assign the group constraints to the features.

9. The apparatus of claim 8, wherein the at least one processor, when determining the group constraints, is further configured to:
   determine a number of distance constraints for at least one of the features; and
   assign a first group constraint to a first feature of the features with a largest number of distance constraints; and
   assign additional group constraints to remaining features of the features based on the first group constraint assigned to the first feature.

10. The apparatus of claim 9, wherein the at least one processor, when assigning the additional group constraints to the remaining features, is configured to:

assign the group constraint for an nth feature of the features based on previously assigned group constraints for 1st through (n−1)th features of the features.

11. An apparatus for assigning group constraints to features in a circuit layout for a multi-patterning process, comprising:
- means for determining features within the circuit layout;
- means for determining distance constraints for at least one of the features;
- means for determining group constraints for the features based on the distance constraints, the group constraints defining equations that logically define limits on groups assignable to each of the features; and
- means for assigning the group constraints to the features.

12. The apparatus of claim 11, wherein the means for determining the distance constraints comprises determining a spacing distance between adjacent features within the circuit layout.

13. The apparatus of claim 12, wherein the means for determining the distance constraints further comprises means for determining the distance constraints based on whether the spacing distance between at least two of the features is less than a threshold spacing distance.

14. The apparatus of claim 11, wherein the features are in a same layer of the circuit layout.

15. The apparatus of claim 11, wherein each group of the groups is a different color, each color corresponding to a different mask set.

16. The apparatus of claim 11, wherein the means for determining the group constraints includes:
- means for determining a number of distance constraints for at least one of the features; and
- means for assigning a first group constraint to a first feature of the features with a largest number of distance constraints; and
- means for assigning additional group constraints to remaining features of the features based on the first group constraint assigned to the first feature.

17. The apparatus of claim 16, wherein the means for assigning additional group constraints to the remaining features of the features comprises:
- means for assigning the group constraint for an nth feature of the features based on previously assigned group constraints for 1st through (n−1)th features of the features.

18. A non-transitory computer-readable medium for storing computer executable code for assigning group constraints to features in a circuit layout for a multi-patterning process, comprising code to:
- determine features within the circuit layout;
- determine distance constraints for at least one of the features;
- determine group constraints for the features based on the distance constraints, the group constraints defining equations that logically define limits on groups assignable to each of the features; and
- assign the group constraints to the features.

* * * * *